United States Patent [19]

Kahn et al.

[11] Patent Number: 5,063,074

[45] Date of Patent: Nov. 5, 1991

[54] LOW FAT LOW CHOLESTEROL MILK PRODUCTS

[75] Inventors: Marvin L. Kahn, Williamsville; John S. O'Mahony, Clarence Center, both of N.Y.

[73] Assignee: Rich Products Corporation, Buffalo, N.Y.

[21] Appl. No.: 472,018

[22] Filed: Jan. 30, 1990

[51] Int. Cl.⁵ .......................... A23C 9/15; A23C 9/154
[52] U.S. Cl. .................................. 426/585; 426/580; 426/584; 426/604
[58] Field of Search ............... 426/580, 583, 585, 588, 426/604, 584, 575, 576, 577, 578

[56] References Cited

U.S. PATENT DOCUMENTS

| | | | |
|---|---|---|---|
| 3,488,198 | 1/1970 | Bundus | 426/585 |
| 4,081,567 | 3/1978 | Haber | 426/580 |
| 4,311,717 | 1/1982 | McGinley | 426/580 |
| 4,623,552 | 11/1986 | Rapp | 426/579 |
| 4,701,329 | 10/1987 | Nelson et al. | 426/580 |
| 4,803,087 | 2/1989 | Karinen | 426/580 |

Primary Examiner—Marianne Cintins
Assistant Examiner—Helen Pratt
Attorney, Agent, or Firm—Kenyon & Kenyon

[57] ABSTRACT

The present invention relates to a low cholesterol, low fat milk that has the taste and mouthfeel of whole milk or 2% milk. The invention also relates to use of said aforementioned milk to produce low cholesterol, low fat dairy products.

11 Claims, No Drawings

LOW FAT LOW CHOLESTEROL MILK PRODUCTS

BACKGROUND OF THE INVENTION

The current wave of increased awareness by the public of the health risks associated with saturated animal fats and cholesterol has accelerated the demand for palatable low fat dairy products. As a result, attempts have been made to develop low fat systems with the mouthfeel of higher fat products.

Arndt, U.S. Pat. No. 3,843,828 discloses a simulated milk product comprising an isolated vegetable protein, whey, and hydrogenated vegetable oil.

Zeller, U.S. Pat. No. 4,631,196 describes a low cholesterol, low calorie, no fat dairy product wherein polydextrose is added to skim milk to provide sweetness and mouthfeel.

Bookwalter et al, U.S. Pat. No. 4,842,884 describes a formulated milk concentrate prepared using nonfat dry milk and vegetable oil, wherein the ratio of nonfat milk solids to water is such that no emulsifiers are required to emulsify the oil.

In addition to dairy products that are low in fat and cholesterol, there are also increasing demands for products fortified with vitamins and/or minerals. Research in the area of fortification of dairy products has concentrated on development of methods whereby the product can be enriched while maintaining its natural flavor and mouthfeel.

Toward this end, Nelson, et al., U.S. Pat. No. 4,701,329 describe a calcium and phosphate enriched fortified milk comprising calcium, tribasic calcium phosphate, carageenan and guar gum having acceptable mouthfeel and flavor. The combination of carageenan and guar gum maintain the suspension of the calcium thus permitting the production of a milk product having the taste and mouthfeel of unfortified milk.

Similarly, Karinen, U.S. Pat. No. 4,803,087 describes enrichment of milk by adding to raw milk, prior to cream separation, pasteurization and homogenization, an aqueous emulsion of edible oil, vitamins A & D, and an emulsifier comprising polyoxyethylene sorbitan monooleate and glycerol monooleate.

Despite the developments of the above substitute dairy products, there has not, as yet, been developed a method whereby a skim milk product can be produced that has the taste and mouthfeel of whole or 2% milk.

SUMMARY OF THE INVENTION

These and other objects are achieved by the present invention, whereby skim milk is combined with a premix comprising a vegetable oil carrier as well as agents which impart texture and flavoring properties to the milk product. The resultant fluid milk has a taste and mouthfeel which approximate that of whole or 2% milk, while having negligible animal fat and cholesterol. With adequate pasteurization, it can be stored at refrigerated temperatures for at least six weeks. Alternatively, the fluid milk can be used to produce a number of low fat, low cholesterol dairy products such as yogurt, cheeses, and buttermilk.

DETAILED DESCRIPTION OF THE INVENTION

The milk product of the present invention is prepared by combining a premix with skim milk. As contemplated by the invention, the premix is essentially a flavoring agent dispersed in a vegetable oil carrier. Most preferably the flavoring agent is emulsified or dispersed in the vegetable oil with the aid of emulsifiers and/or gums. The premix may be added to skim milk at a level of 1 to about 5% by weight; most preferably it is added at a level of about 1.5 to 2%.

In representative formulations of the present invention, the premix preferably comprises about 50 to about 70% non-tropical vegetable oil, about 6 to about 10% emulsifier, about 15 to about 20% gum and about 6 to about 10% flavoring agent. Most preferably, the premix comprises about 60% non-tropical vegetable oil, about 8% emulsifier, about 18% gum and about 8% flavoring agent. It may further comprise additional vitamins and/or minerals, such as calcium, at levels of up to 20% by weight.

Throughout this application, all amounts are by weight unless expressly stated otherwise. In addition, percentages are on a total formulation basis unless another basis is specified.

Any non-tropical vegetable oil may be employed in practicing the present invention. Most preferably, a nonlauric oil is chosen which is tasteless and odorless, and which remains so during extended storage of the product. Such oils are selected by their non cholesterolemic or hypocholesterolemic properties. Suitable oils include soybean, safflower, corn, cottonseed, sunflower, peanut, olive and canola oils or any combination thereof.

The emulsifier component is most preferably comprised of a mixture of 35–54% mono and diglycerides, 23–43% sodium stearoyl lactylate and 12–32% polysorbate 60. Alternatively, any non-lauric emulsifier approved for food use and exhibiting similar emulsifying properties can be used to produce the milk product of the present invention. These may include hydroxylated lecithin, mono, di or polyglycerides of fatty acids, such as monostearin and monopalmitin; polyhydric alcohols, such as the polyoxyethylene ethers of sorbitan monostearate (polysorbate 60 or 80) or the polyoxyethylene ethers of sorbitan distearate; fatty ethers of polyhydric alcohols such as sorbitan monostearate; mono and diesters of glycols such as propylene glycol monostearate, and propylene glycol monopalmitate, succinoylated monoglycerides; sodium or calcium stearoyl-2-lactylate; and the ethers of carboxylic acid such as lactic, citric, and tartaric acids with the mono and diglycerides of fatty acids such as glycerol lactopalmitate and glycerol lactostearate. The fatty acids employed in the preparation of the emulsifiers include those derived from beef, tallow, and coconut, cottonseed, palm, peanut, soybean and marine oils. Many blends of emulsifiers are commercially used and readily available in accordance with known techniques.

The premix is preferably comprised of about 15 to about 20% stabilizers and/or gums which prevent settling and/or emulsify the flavoring component in the premix and which further provide mouthfeel in the final product. Most preferably, a combination of about 93 to about 97% microcrystalline cellulose and about 3 to about 7% carageenan is used to create a mouthfeel most similar to whole or 2% milk. Other gums or stabilizers which exhibit similar properties may be employed in practicing the present invention. These include sodium carboxymethylcellulose (CMC), guar, locust bean, acacia, carageenan or other naturally derived or modified gums, biologically produced gums such as xanthan, or modified starches, appropriately modified for the particular use.

The premix is further comprised of flavoring agents, which may include any or all of the following: chocolate, vanilla, strawberry, coffee, mocha, banana or any other suitable flavoring at a level of about 6 to about 10%. Most preferably, the flavoring agent comprises a mixture of natural vanilla and natural milk distillate, wherein the natural milk distillate comprises between about 70 and about 90% of the flavoring agent. Natural milk distillate is a commercially available distillate of whole milk.

The premix may also comprise additional vitamins or minerals for the purpose of fortification. Most preferably, calcium in the form of tri-calcium phosphate, calcium lactate, orthophosphates, calcium chloride or any other suitable form may be added to the premix at a level of 15 to about 20%.

The premix is prepared by combining the vegetable oil with a flavoring agent. Most preferably, the flavoring agent is suspended or emulsified in the vegetable oil using emulsifiers and stabilizers. The premix so prepared is then added to skim milk with mixing at 130° F. until the premix is completely dissolved in the milk. The mixture is then pasteurized using either a UHT (ultra high temperature) treatment, at about 180°-240° F. for about 2 to 5 seconds, or using a high temperature short time (HTST) process, which is accomplished at about 161° F. for about 15 seconds. Following pasteurization, the product is homogenized at 500/2500 psi range total 1500-3000, cooled and packaged.

The milk product so produced is suitable for immediate consumption in place of milk. Alternatively, the product can be further processed to produce a number of dairy products with lower fat and cholesterol contents than their counterparts made from whole milk. It has been found, for example, that yogurt, buttermilk, cheddar cheese and cottage cheese made using the milk product prepared as described above have similar flavor and textural characteristics to similar products made with low fat milk.

The invention will be more fully understood in the light of the following examples which are set forth below for illustrative purposes only and are not intended to be limiting.

EXAMPLES

EXAMPLE 1

Illustrative of the dairy product that can be made according to the invention is a low cholesterol, low fat milk product wherein about 1 to about 5% by weight of a premix is added to skim milk. The premix is essentially a mixture of about 50 to about 70% non-tropical vegetable oil, about 15 to about 20% gum, about 6 to about 10% emulsifier, and about 6 to about 10% of a flavoring agent. The flavoring agent in this example is a mixture of vanilla flavoring and natural milk distillate, a flavor distillate of whole milk.

The formulation used to prepare the premix in this example was:

| Ingredient | Weight (grams) |
| --- | --- |
| soybean oil | .984 |
| tri-calcium phosphate | .300 |
| microcrystalline cellulose | .250 |
| mono and diglycerides | .056 |
| sodium stearoyl lactylate | .042 |

| Ingredient | Weight (grams) |
| --- | --- |
| polysorbate 60 | .028 |
| carageenan (kappa) | .015 |
| natural milk extract | .100 |
| natural vanilla 5X | .020 |
| | 1.795 grams |

To 98.205 grams of skim milk (Vitamin A & D added) were added 1.795 grams of premix which were mixed at 130° F. until the premix was completely dissolved in the milk. The mixture was then pasteurized at 161 F for 15 seconds (HTST) or at 180°-240 F. for 2 to 5 seconds (UHT). Following homogenization at 500/2500 psi range total 1500-3000 psi, the product was cooled through a heat exchanger to 32°-40° F. and packaged. The product so produced was stored at 36° to 40° F. in distribution. Product that received the HTST pasteurization had a shelf life of about two weeks, wherein product that was processed under UHT conditions had a shelf life of at least six weeks.

EXAMPLE 2

The milk product produced in Example 1 was sterilized, cooled at room temperature and inoculated with lactic acid bacteria (*L. bulgaricus* ATCC 11842 and *S. thermophilus* ATCC 14485; 50:50 ratio) at 5% by weight level. The product was incubated at 43° C.±1° C. for 16 hours. The complete yogurt flavor is obtained because lactobacilli are grown in association with the moderate acid producing *Streptococcus thermophilus* species. The lactobacilli, in turn, during their growth liberate amino acids which stimulate *S. thermophilus* growth. The streptococci, in addition, produce formate as a metabolic byproduct which enhances the growth of the lactobacilli. Analysis of the yogurt products produced using the milk product as described in Example 1 as well as regular milk are set forth in Table 1. As can be seen from the data described therein, the yogurt made with the Example 1 milk was slightly less acidic compared to yogurt made with regular milk. The flavor of the yogurt made with the Example 1 milk was acceptable, and it had a smooth, light custard texture.

TABLE 1

| Analysis of yogurt made with control (whole) milk and Example 1 milk product | | |
| --- | --- | --- |
| | Control | Example 1 milk |
| Fat (Mojonnier) | 3.42% | 1.17 |
| Solids (100 C/Vacuum) | 12.09% | 10.47 |
| Protein | 3.16 | 3.15 |
| PH | 3.76 | 4.12 |
| TTA (% lactic) | 1.35 | 0.91 |
| Brookfield Viscosity (CPS @65F) Needle 4 Speed 50 | 590 | 370 |
| A 250 ML beaker used because of low amount of sample | | |

EXAMPLE 3

Production of Cottage Cheese

Milk made according to Example 1 was pasteurized (79° C. for 5 minutes), cooled to 20° C. and inoculated with lactic acid starter culture. The culture contained *S. lactis* at a 5% level by weight and 0.2% by weight rennin was also added. The rennin allows the curd to be cut at slightly higher pH and also provides a sweeter curd.

After adding the culture and rennin, the mixture was incubated at 32° C.±1° C. for 5 hours (short-set method). After fermentation, the curd was heated at 38° C. for 40 to 45 minutes and washed thoroughly with water at 20° C. A control was also run (1% lowfat milk). The resultant products were analyzed. The data regarding cottage cheese samples are set forth in Tables 2 and 3. Data regarding the whey produced from the cottage cheese (the data for which is set forth in Table 2), is presented in Table 4. The cottage cheese made with the Example 1 milk had a delicate flavor and texture similar to and characteristic of good quality cottage cheese.

TABLE 2

Analysis of Cottage Cheese Samples

| Test | Sample Information | PH | TTA | Solids | Brookfield Viscosity* | Fat |
|---|---|---|---|---|---|---|
| 1 | Example 1 milk | 4.10 | 0.9 | 10.48 | 840 412 | 1.16 |
| 2 | Whole Milk | 3.77 | 1.4 | 11.73 | 920 508 | 3.38 |
| 3 | 1% Milk Fat | 3.67 | 1.3. | 9.85 | 800 440 | 1.07 |
| 4 | 2% Milk Fat | 3.74 | 1.3 | 10.20 | 720 392 | 1.78 |

*Values given for CPS @ 20 and 50

TABLE 3

Analysis of Cottage Cheese Samples

| Test | Sample Information | PH | TTA | Protein | Solubility Index |
|---|---|---|---|---|---|
| 1 | Example 1 milk Cottage Cheese | 6.20 | 0.26 | 15.56 | 2.00 |
| 2 | 1% Lowfat Cottage Cheese | 6.52 | 0.10 | 14.38 | 1.75 |

TABLE 4

Analysis of cottage cheese whey samples

|  | Example 1 Milk | 1% Milk |
|---|---|---|
| Fat by Mojonnier | 1.09 | 0.75 |
| Solids 100 C/Vacuum | 92.7 | 95.83 |
| Protein | 8.18 | 7.32 |
| Ash | 9.16 | 8.84 |
| TTA | 3.46 | 3.56 |

EXAMPLE 4

Production of Buttermilk

Milk made according to Example 1 was pasteurized at 79° C. for 5 minutes, cooled at 20° C. and inoculated with lactic acid starter culture. The culture contained *S. cremoris, L. citrovorum* and *S. diacetylactis* at the 0.5% level by weight and 0.1% by weight salt was also added. After adding culture and salt, the mixture was incubated at 22° C.±1° C. for 16 hours. The resultant products were analyzed; the data obtained is reported in Table 5. As can be seen from the data presented therein, the buttermilk product made with the example 1 milk had nice body and appearance, with less acidity than the controls, which were made with skim milk and 1% milk.

TABLE 5

Analysis of Buttermilk samples

| Test | Sample Information | pH | TTA | Protein |
|---|---|---|---|---|
| 1 | 1% Lowfat Buttermilk | 4.60 | 0.54 | 3.31 |

TABLE 5-continued

Analysis of Buttermilk samples

| Test | Sample Information | pH | TTA | Protein |
|---|---|---|---|---|
| 2 | Skim Milk Buttermilk | 4.85 | 0.49 | 3.41 |
| 3 | Example 1 milk Buttermilk | 4.62 | 0.59 | 3.35 |
| 4 | Sealtest Buttermilk | 4.40 | 0.66 | 3.24 |

EXAMPLE 5

Production of Hard Cheese and Whey

Milk made according to Example 1 was pasteurized (79° C. for 5 minutes) cooled to 20° C. and inoculated with lactic acid starter culture. The culture contained S. lactis at a 5% level by weight and 0.2% level by weight rennin. After adding the culture and rennin, the mixture was incubated at 32° C.±1° C. for 5 hours (short-set method). After fermentation, the curd was heated at 40° C.±1° for 35 to 45 minutes, and the whey was collected separately. The matted curd was transferred to cheese cloth to remove further whey and refrigerated. The liquid whey was dried at 55° C.±2° C. for 48 hours. Data generated from analysis of the cheese as well as hard cheese produced under the same conditions from 1% milk are shown in Table 6. The hard cheese had a nice creamy texture.

TABLE 6

Analysis of cheese products

|  | Example 1 Milk | 1% Lowfat Milk |
|---|---|---|
| Protein | 25.78 | 24.85 |
| pH | 4.66 | 5.34 |
| TTA | 1.58 | 0.34 |

What is claimed is:

1. A low fat, low cholesterol milk product approximating the taste and mouthfeel of whole or 2% milk comprising about 95 to about 99% skim milk and about 1 to about 5% of a premix, wherein said premix comprises about 50 to about 70% non-tropical vegetable oil, about 15 to about 20% food grade gum, about 6 to about 10% of a flavoring agent and about 6 to about 10% non-lauric emulsifier, said emulsifier comprising about 35 to about 54% mono and diglycerides, about 23 to about 43% sodium stearoyl lactylate and about 12 to about 32% polysorbate 60.

2. A milk product according to claim 1 wherein said non-tropical vegetable oil is selected from the group consisting of soybean, saflower, corn, cottonseed, sunflower, olive, and canola oils.

3. A milk product according to claim 1 wherein said flavoring agent is selected from the group consisting of vanilla, cocoa, strawberry, mocha and banana.

4. A milk product according to claim 1 wherein said flavoring agent comprises a distillate of milk.

5. A milk product according to claim 4 wherein said distillate comprises about 70 to about 90% of the flavoring agent.

6. A milk product according to claim 1 wherein said premix further comprises about 15 to about 20% calcium.

7. A milk product according to claim 6 wherein said calcium is provided by a source selected from the group consisting of tricalcium phosphate, calcium lactate, orthophosphates, calcium chloride, or any other source of calcium having high biologic availability.

8. A milk product according to claim 1 wherein said food grade gum is selected from the group consisting of sodium carboxymethylcellulose (CMC), microcrystalline cellulose, guar gum, locust bean gum, gum acacia, carageenan, xanthan or other biologically produced gums, naturally derived gums or modified gums and modified starches.

9. A milk product according to claim 8 wherein said food grade gum comprises about 93 to about 97% microcrystalline cellulose and about 3 to about 7% carageenan.

10. A milk product according to claim 1 wherein about 4 to about 8% by weight of the skim milk is replaced by sugar.

11. A low fat, low cholesterol calcium fortified milk product approximating the taste and mouthfeel of whole or 2% milk comprising about 98% skim milk and about 2% of a premix, said premix comprising about 55% non-tropical vegetable oil, about 17% tri-calcium phosphate, about 14% microcrystalline cellulose, about 3% mono and diglycerides, about 2% sodium stearoyl lactylate, about 1.6% polysorbate 60, about 0.8% kappa carageenan, about 5.5% natural milk extract and about 1% natural flavoring.

* * * * *